(12) United States Patent
Zabar

(10) Patent No.: US 6,323,568 B1
(45) Date of Patent: Nov. 27, 2001

(54) ELECTROMAGNETIC VIBRATOR AND PUMP INCLUDING SAME

(75) Inventor: Nahum Zabar, Ganei Tikva (IL)

(73) Assignee: MNDE Technologies, L.L.C., New York, NY (US)

( * ) Notice: Subject to any disclaimer, the term of this patent is extended or adjusted under 35 U.S.C. 154(b) by 0 days.

(21) Appl. No.: 09/482,100

(22) Filed: Jan. 13, 2000

(30) Foreign Application Priority Data

Jan. 17, 1999 (IL) ........................................... 128085

(51) Int. Cl.[7] .................................................. H02K 41/00
(52) U.S. Cl. .................................. 310/12; 310/14; 418/417
(58) Field of Search .................................... 310/12, 14, 15, 310/21, 23, 29, 30, 32, 33, 36, 81; 417/417, 418; 335/266

(56) References Cited

U.S. PATENT DOCUMENTS

| | | | |
|---|---|---|---|
| 3,894,817 | * | 7/1975 | Majoros et al. ..................... 417/415 |
| 4,169,234 | * | 9/1979 | Yonkers ................................ 310/29 |
| 4,909,712 | * | 3/1990 | Mortenson ......................... 417/417 |
| 4,968,224 | * | 11/1990 | Hashimoto ....................... 417/413.1 |
| 5,013,223 | * | 5/1991 | Takahashi et al. ............... 417/413.1 |
| 5,222,878 | * | 6/1993 | Osada et al. ....................... 417/417 |
| 5,682,132 | * | 10/1997 | Hiroyashi et al. ................... 310/29 |
| 6,169,342 | * | 1/2001 | Schmillen et al. ................... 310/12 |

FOREIGN PATENT DOCUMENTS

| | | | |
|---|---|---|---|
| 2946542-A | * | 5/1981 | (DE) . |
| 200-217325 | * | 8/2000 | (JP) . |
| WO-90/05851 | * | 5/1990 | (WO) . |
| WO-94/1861 | * | 8/1994 | (WO) . |

* cited by examiner

Primary Examiner—Joseph Waks
(74) Attorney, Agent, or Firm—Benjamin J. Barish

(57) ABSTRACT

An electromagnetic vibrator, includes a pair of electromagnets each having a core of E-configuration to define three parallel legs joined together at one side by a bridge, and a coil on the middle leg. The electromagnets are secured together with their bridges facing outwardly and with their legs aligned with, but spaced from, each other. A plunger carrying magnetisable material is disposed within the space between the legs of the electromagnets such as to be movable along the longitudinal axis of the plunger upon the energization of the coils of the electromagnets. A pair of springs yieldingly mount the opposite ends of the plunger to the electromagnets, each spring being yieldable in the direction of the longitudinal axis of the plunger and stiff in the direction of the transverse axis of the plunger.

23 Claims, 5 Drawing Sheets

ELECTROMAGNETIC VIBRATOR AND PUMP INCLUDING SAME

FIELD AND BACKGROUND OF THE INVENTION

The present invention relates to electromagnetic vibrators which are particularly useful for driving linear-type pumps. The invention also relates to a leaf spring construction particularly useful in such electromagnetic vibrators.

Linear-type pumps, which include electromagnetic vibrators for reciprocating a plunger, generally provide a number of important advantages over rotary-type pumps, including the following: long life, low noise level, high efficiency, compact structure, smooth air flow, and simple maintenance eliminating the need for lubrication. In one type of linear pump, the pumping member driven by the electromagnetic vibrator is a diaphragm; and in a second type of linear pump, the pumping member is a piston. Generally speaking, electromagnetic vibrators suitable for driving diaphragms are not suitable for driving pistons unless they include low friction guiding bearings which constrain the movements of the plunger to longitudinal displacement. Such guiding bearings, however, increase wear and tear, and decrease efficiency.

One type of electromagnetic vibrator uses a plunger containing soft ferromagnetic material, and another type uses a plunger containing permanent magnets. Electromagnetic vibrators utilizing soft ferromagnetic material are generally less costly than those utilizing permanent magnets.

OBJECT AND BRIEF SUMMARY OF THE INVENTION

An object of the present invention is to provide a novel electromagnetic vibrator which can be constructed as a universal drive for driving either piston-type pumps, or diaphragm-pumps, as well other devices. Another object of the invention is to provide a linear pump including the novel electromagnetic vibrator; and a further object is to provide a leaf spring construction particularly useful in the novel electromagnetic vibrator of the present invention.

According to one aspect of the present invention, there is provided an electromagnetic vibrator, comprising: an electromagnetic assembly including a pair of electromagnets each having a core of E-configuration to define three parallel legs joined together at one side by a bridge, and further including a coil on the middle one of the three legs; the pair of electromagnets being secured together with the bridges facing outwardly and with the legs aligned with, but spaced from, each other; a plunger carrying magnetisable material disposed within the space between the legs of the electromagnets with the longitudinal axis of the plunger perpendicular to said parallel legs such that the plunger is movable along the longitudinal axis of the plunger upon the energization of the coils of the electromagnets; the coils of the electromagnets being energized by unidirectional current such that the middle leg of each electromagnet defines a first magnetic pole of one sense, which is the same in both electromagnets, and the other two legs define second and third magnetic poles of the opposite sense in the two electromagnets; and spring means including at least one spring yieldingly mounting the plunger to the electromagnets.

According to further features in the preferred embodiments of the invention described below, the plunger includes a non-magnetic stem carrying a ferromagnetic member acted upon by the first and second magnetic poles of each electromagnet, and a ferromagnetic member acted upon by the first and third magnetic poles of each electromagnet.

According to another aspect of the present invention, there is provided a pump having a reciprocatable pumping member, and an electromagnetic vibrator as described above for driving the reciprocatable pumping member. Because of the low transverse displacement of the plunger when using the electromagnetic vibrator of the present invention as will be described more particularly below, the pumping member may be either a piston or a diaphragm.

According to still a further aspect of the present invention, there is provided a leaf spring particularly useful for mounting one end of a plunger to an electromagnet assembly, the leaf spring including a center leg straddled on its opposite side by a pair of side legs all integrally joined together at their opposite ends by a crossbar; the center leg being formed with a hole for fixing thereto the respective end of the plunger, and each of the side legs being formed with a hole for fixing the leaf spring to the electromagnet assembly.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF PREFERRED EMBODIMENTS

Figure 1:
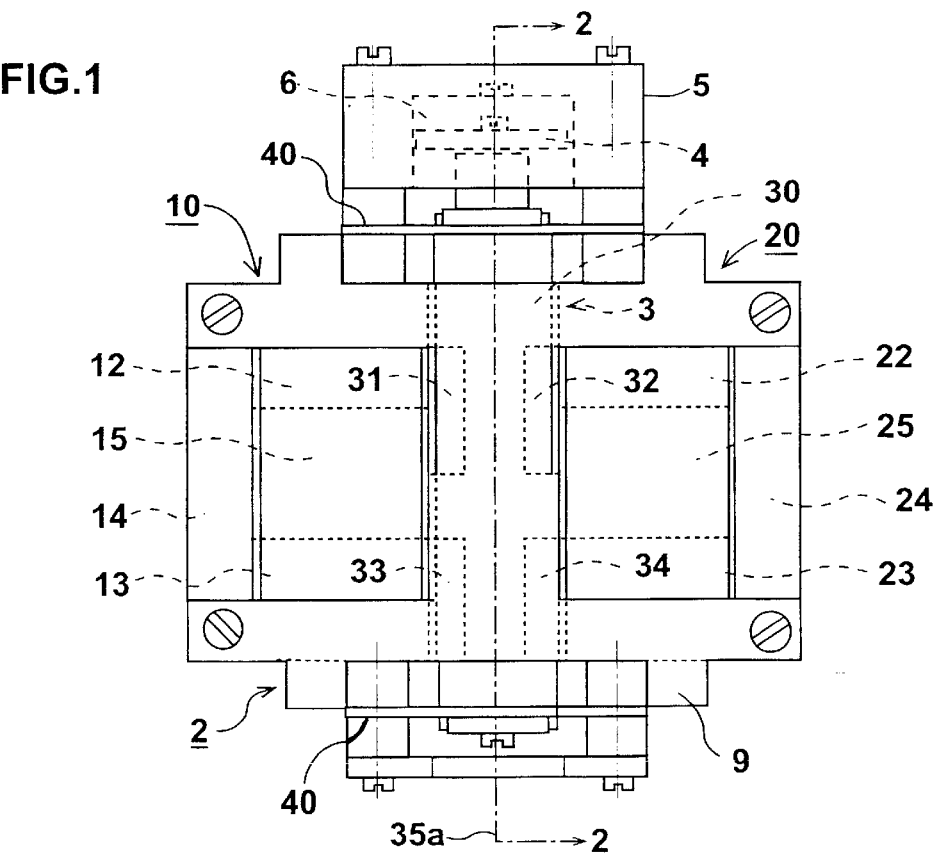
FIG. 1 is a plan-view illustrating one form of linear pump including an electromagnetic vibrator constructed in accordance with the present invention.
Figure 2:
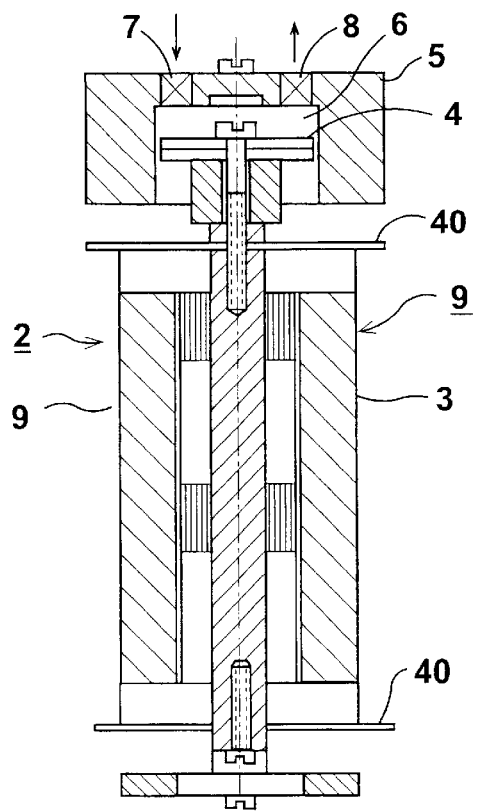
FIG. 2 is a sectional view along line 2—2 of FIG. 1.
Figure 3:
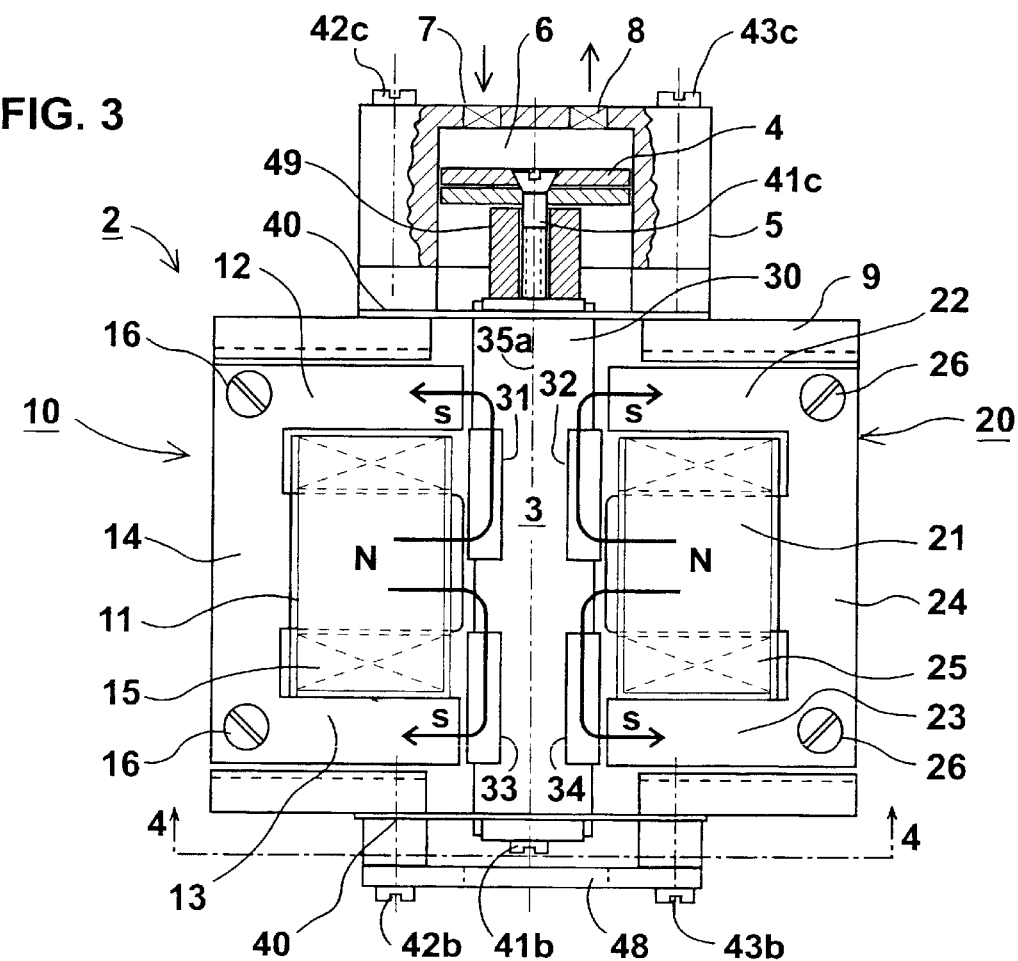
FIG. 3 is a plan-view, partly in section, illustrating the magnetic circuit in the linear pump of FIG. 1.

FIGS. 1–3 illustrate a piston-type linear pump constructed in accordance with the present invention. Briefly, it includes an electromagnetic vibrator comprising an electromagnet assembly, generally designated 2, which reciprocates a plunger 3. Plunger 3 is coupled to a piston 4 movable within a cylinder 5 to define a pumping chamber 6 between the piston 4 and cylinder 5. Cylinder 5 further includes a one-way valve 7 (FIGS. 2, 3) permitting the inflow of air during the expansion of pumping chamber 6, and another one-way valve 8 permitting the outflow of air during the contraction of the pumping chamber. Electromagnet assembly 2 and cylinder 5 are mounted on a common base member 9.

Figure 10:
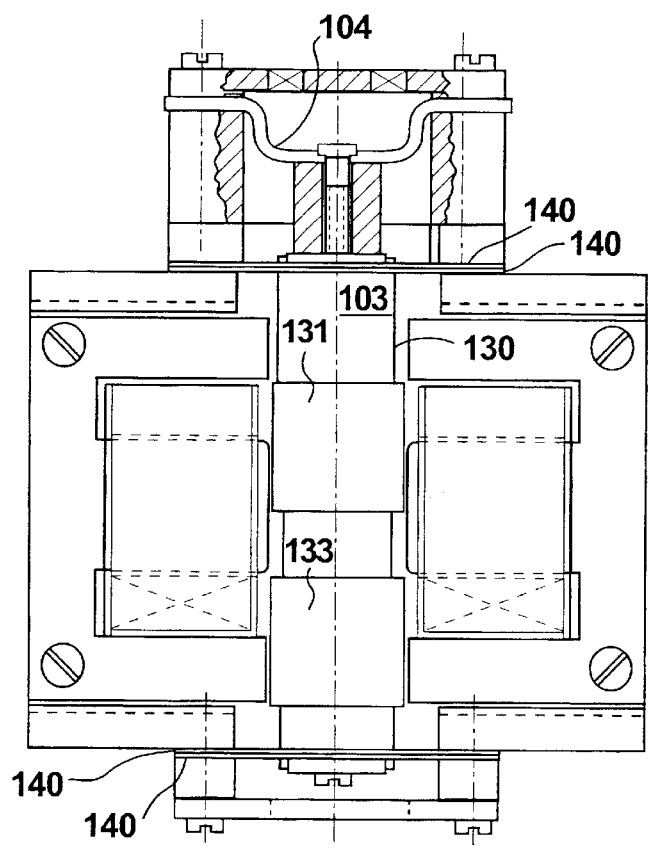
FIG. 10 illustrates a diaphragm-type pump constructed in accordance with the invention and including other modifications in the electromagnetic vibrator for driving the diaphragm.

As described below, the electromagnetic vibrator is constructed such that it produces relatively large longitudinal movements, but relatively negligible transverse movements, of the plunger 3, thereby making the vibrator useful as a universal drive for driving not only piston-type linear pumps as illustrated in FIGS. 1–3, but also diaphragm-type linear pumps as illustrated in FIG. 10, as well as other types of devices requiring a linear drive.

As more particularly illustrated in FIG. 3, the electromagnetic assembly 2 includes a pair of electromagnets, generally designated 10 and 20, respectively, secured to base member 9. Each electromagnet includes a core of E-configuration made of a plurality of laminations of soft ferromagnetic material and defining three parallel legs 11, 12, 13 and 21, 22, 23, respectively, joined together on one side by a bridge 14, 24. Each electromagnet further includes a coil 15, 25, on its middle leg 11, 21. The electromagnets 10, 20, are secured by fasteners 16, 26, to base member 9, such that bridges 14, 24, face outwardly, and their legs 11–13, 21–23, are aligned with, and spaced from, each other to define the gap for receiving the plunger 3.

The electromagnets are mounted on shock absorbers 17, 27 by means of the fasteners 16, 26, to isolate the mounting surface from the vibrations that are produced by the vibrator.

As will be described below particularly with respect to FIGS. 6 and 7, the two coils 15, 25, are energized with unidirectional current such that the middle leg 11, 21, of each electromagnet 10, 20, defines a first magnetic pole of one sense (e.g., North), and the other two legs 12, 13 and 22, 23, define second and third magnetic poles of the opposite sense (e.g., South).

Plunger 3 includes a non-magnetic stem 30, such as plastic or aluminum, carrying four ferromagnetic members 31, 32, 33 and 34, which are acted upon by the magnetic fields produced by the two electromagnetic coils 15, 25, to reciprocate the plunger 3. As shown particularly in FIG. 3, ferromagnetic members 31 and 32 are fixed to one end of stem 30, at its opposite sides, and are acted upon by the magnetic poles of legs 11, 12 and 21, 22, respectively; and ferromagnetic members 33 and 34 fixed to the opposite end of stem 30, at its opposite sides, and are acted upon by the magnetic poles of legs 11, 13, and 21, 23, respectively. Each of the four magnetic members 31–34 is of rectangular cross-section fixedly applied (e.g., by glue) to the respective side of stem 30.

Electromagnets 10, 20, acting on ferromagnetic members 31–34, produce a force tending to move stem 3 in the longitudinal direction, i.e., parallel to the longitudinal axis 35a of the stem. This movement is resisted by a pair of leaf springs 40 each yieldingly mounting one end of the plunger to the electromagnets. The two electromagnets also produce a force tending to move stem 3 in the transverse direction relative to the stem, but these transverse forces are substantially equal and opposite and therefore tend to cancel each other.

Figure 5:
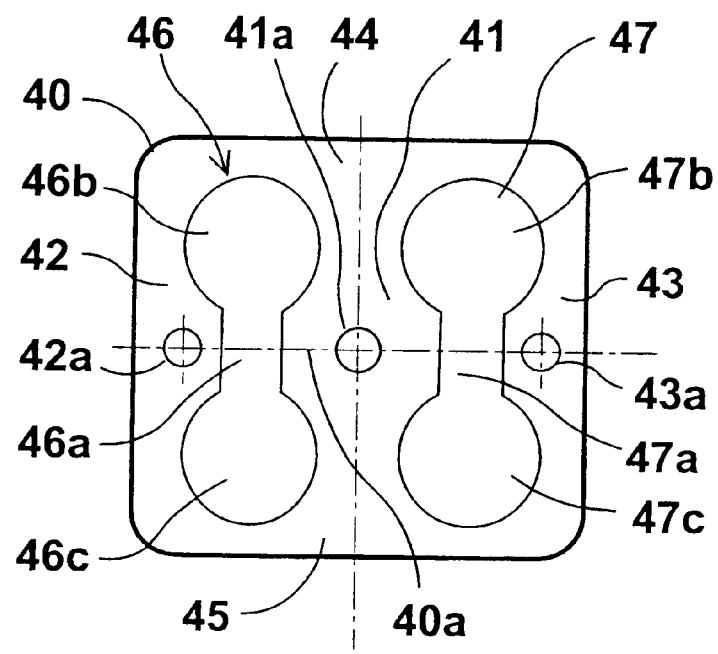
FIG. 5 more particularly illustrates the construction of one of the leaf springs used in the electromagnetic vibrator of FIGS. 1–4.

FIG. 5 more particularly illustrates the construction of leaf spring 40, each of the opposite ends of plunger 3. As shown in FIG. 5, leaf spring 40 is of square configuration stamped from spring sheet material. It is integrally formed with a center leg 41 straddled on its opposite side by a pair of side legs 42, 43, all integrally joined together at their opposite ends by crossbars 44, 45. The center leg 41 is formed with a hole 41a for fixing thereto the respective end of the plunger 3; and the two side legs 42, 43, are formed with holes 42a, 43a, for fixing the leaf spring to the electromagnet assembly 2. All three holes 41a, 42a, 43a are colinear with the central axis 40a of the leaf spring.

The three legs 41, 42, 43 of each leaf spring 40 are defined by two cutouts 46, 47, of the same configuration. Cutout 46 is between the center leg 41 and side leg 42. It includes a narrow slit section 46a perpendicular to and crossing the center axis 40a of the leaf spring, and joined to enlarged circular sections 46b, 46c, at the opposite ends of the narrow slit section. Cutout 47, located between central leg 41 and side leg 43, includes a similar narrow slit section 47a joined at its opposite ends to enlarged circular sections 47b, 47c. The central axes of the narrow slit sections 46a, 47a, are colinear with the center of the enlarged circular sections 46b, 46c, and 47b, 47c, at the opposite ends of the slit sections.

It will be seen from FIG. 5 that the cutouts 46, 47, as described above, produce enlarged areas around each of the holes 41a, 42a, 43a, for reducing stress concentrations at these fixation points to the plunger 3, and to the electromagnetic assembly 2. These cutouts also produce enlarged areas at the junctures of the legs 41–43 with the crossbars 44, 45, for increasing the resistance of the leaf spring to bending and torsion stresses. The two leaf springs 40 mounting the opposite ends of plunger 3 thus produce yieldability in the longitudinal direction of the plunger (i.e., parallel to its longitudinal axis 35a), but a high degree of stiffness in the transverse direction of the plunger (i.e., parallel to the center axis 40a of the leaf springs).

Figure 4:
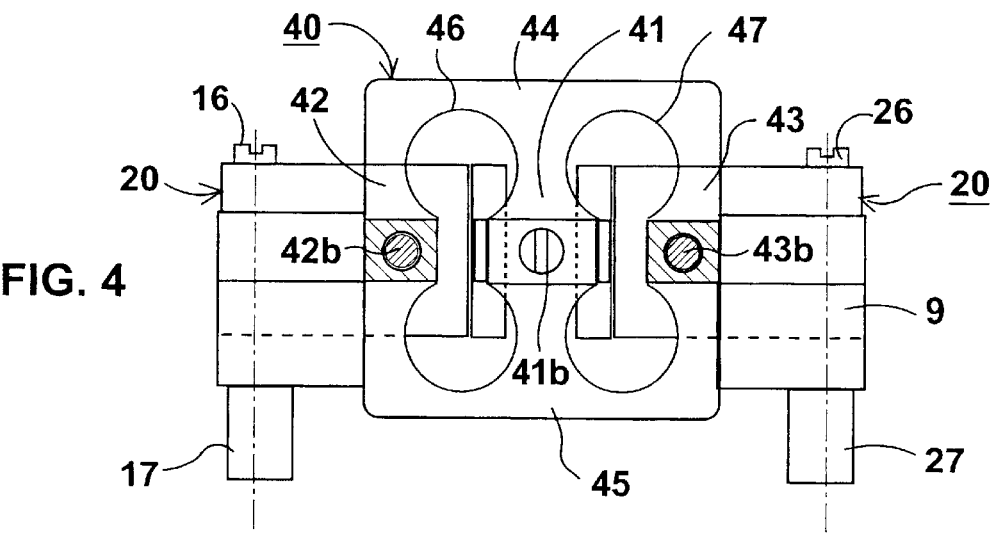
FIG. 4 is a sectional view along line 4—4 of FIG. 3.

As shown particularly in FIGS. 3 and 4, the center leg 41 of leaf spring 40 at one end (the lower end in FIG. 3) of plunger 3 is secured by a fastener 41b, to the respective end of the plunger. The side legs 42, 43, are secured to the electromagnetic assembly 2, by fasteners 42b, 43b via a common bridge member 48.

Leaf spring 40 at the opposite end of the plunger 3 is similarly secured to the plunger 3 and the two electromagnets 10, 20, by fasteners 41c, 42c, and 43c. Fastener 41c, however, has an elongated shank for passing through the piston 4 and through a spacer 49 between the piston and the plunger 3. Fasteners 42c and 43c also have elongated shanks for passing through cylinder 5 defining the pumping chamber 6 with piston 4, which housing also bridges the two side legs 42, 43 of the leaf spring.

Figure 5A:
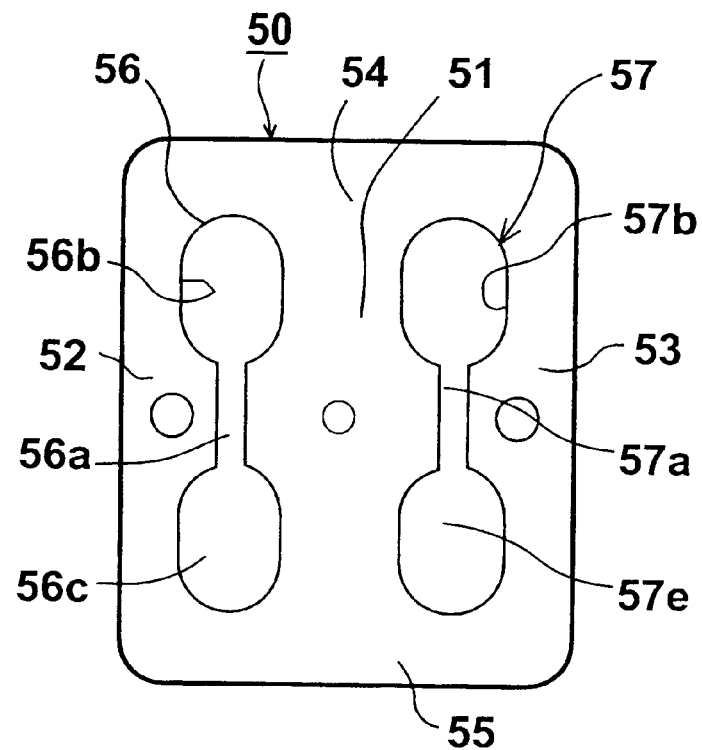
FIG. 5a illustrates a variation in the construction of the leaf spring.

FIG. 5a illustrates a modification in the construction of the leaf spring 40 of FIG. 5. In the modification of FIG. 5a, the leaf spring, therein designated 50, is similarly formed with three legs 51, 52, 53 joined at their opposite ends to crossbars 54, 55, defined by cutouts 56, 57, similar to the corresponding elements 41–47 in FIG. 5. Leaf spring 50 of FIG. 5a, however, is elongated in the direction to increase the lengths of the legs 41–43. In addition, the enlarged curved sections 56b, 56c, and 57b, 57c, at the opposite ends of the narrow slits 56a, 57a, are of an elongated circular shape. Further, the center axes of the narrow slit sections 56a, 57a, are displaced laterally of the centers of their elongated circular sections 56b, 56c, 57b, 57c, in the direction of the side legs 52, 53. This modification increases the yieldability of the center leg 51, which is fixed to the plunger 3, in the longitudinal direction of the plunger.

Figure 6:
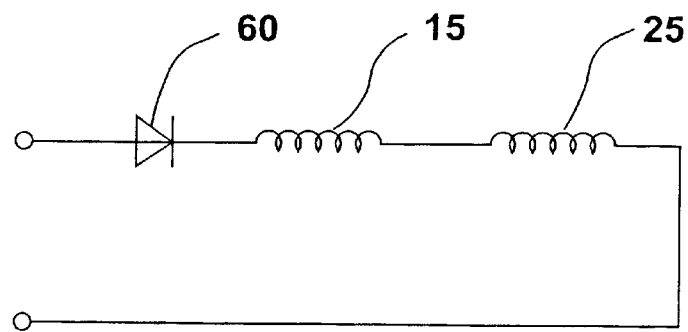
FIG. 6 illustrates the power supply for energizing the coils in the electromagnets of FIGS. 1–3, the coils being connected in a series.
Figure 7:
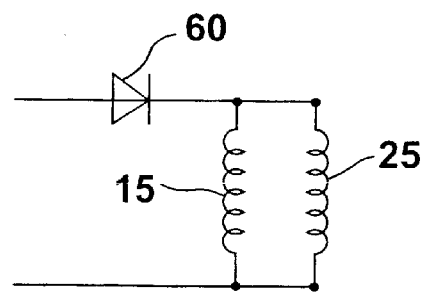
FIG. 7 illustrates a circuit similar to that of FIG. 6 but with the coils connected in parallel.

FIG. 6 illustrates an electrical circuit for energizing the coils 15, 25, with unidirectional current. In FIG. 6, the two coils are connected in series, and the unidirectional current is produced by a half-wave rectifier 60. Such an arrangement would be suitable, for a 220–230 volt AC supply as in Europe.

FIG. 6a illustrates a similar circuit except the two coils 15, 25, are connected in parallel. This circuit is particularly useful with a 110–115 volt AC supply as in the USA.

In either circuit, the unidirectional current applied to the two coils 15, 25, carried by the middle leg 11, 21, of the two electromagnets 10, 20, produces a magnetic pole of one sense (e.g., North) in the center legs, and magnetic poles of the opposite sense (e.g., South) in the two side legs 12, 13, and 22, 23, of the two electromagnets. Each unidirectional pulse of current produces a magnetic field which acts on the four magnetic members 31–34 fixed to stem 3 to move the stem in the longitudinal direction against the leaf springs 40. As soon as the magnetic field collapses by the termination of the pulse, the energy stored within the leaf springs 40 moves the plunger in the opposite direction.

Figure 8:
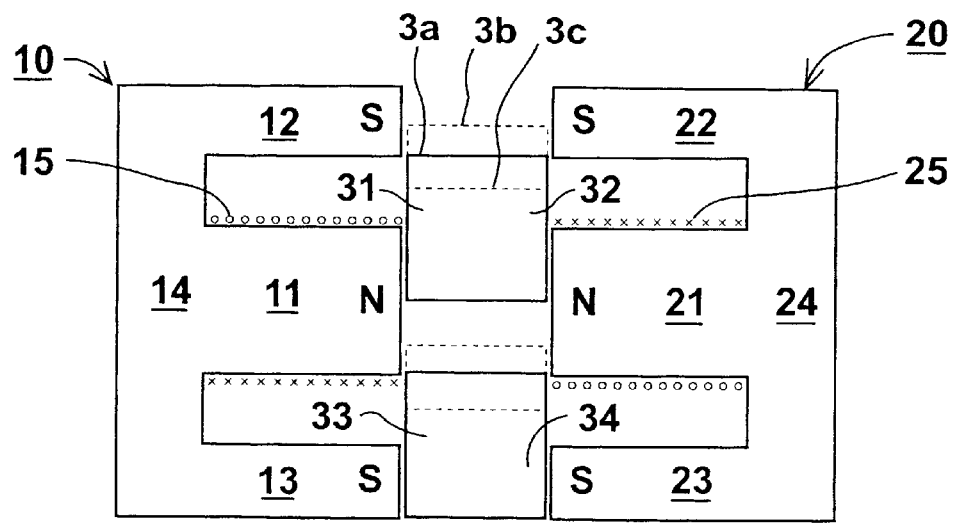
FIG. 8 more particularly illustrates the reciprocatory movements of the plunger.

FIG. 8 schematically illustrates the normal position 3a of plunger 3 when no magnetic field is present; one limit position 3b when driven by the magnetic field; and the opposite limit position 3c when returned by the leaf springs 40. The application of unidirectional current to the two electromagnets 10, 20, thus produces a vibratory or reciprocatory movement of plunger 3 parallel to its longitudinal axis.

This vibratory movement of plunger 3 is transmitted to piston 4 within cylinder 5, to draw air through one-way valve 7 in one stroke, and to pump air out through one-way valve 8 during the next stroke.

Preferably, the natural frequency of the springs 40, plunger 3, and piston 4 is substantially equal to the frequency of the AC power supply to obtain resonance.

Figure 9:
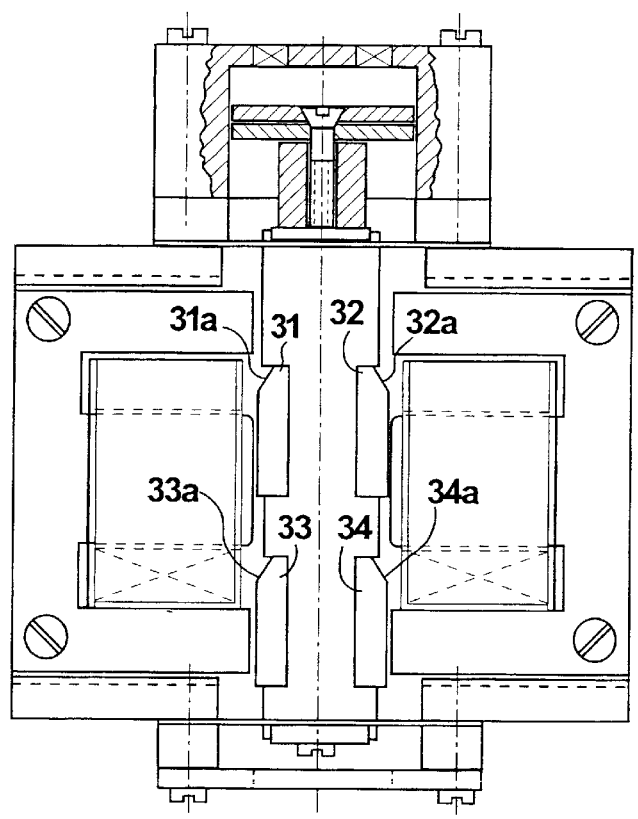
FIG. 9 illustrates a modification in the construction of the ferromagnetic member of the plunger in FIGS. 1–3.

FIG. 9 illustrates a modification wherein the ferromagnetic members 31–34 are tapered, as shown at 31a–34a, respectively.

The foregoing arrangement, which permits relatively large longitudinal displacement of the plunger but only negligible transverse displacements, provides a number of important advantages. First, it enables the vibrator to be used for driving not only diaphragm-type pumps which can accommodate relatively large transverse displacements, but also piston-type pumps which can not accommodate significant transverse displacements. In addition, this construction permits the gap between the plunger and the electromagnets to be very small, thereby increasing efficiency. Further, the described construction permits the use of soft ferromagnetic material for the magnetic elements 31–34, which are considerably less expensive than permanent magnets. In addition, it obviates the need for slideable bearings. It thereby reduces wear, and provides long useful life. Finally, the larger surface areas of the leaf springs at the fixation points reduce stress concentration thereat; and the larger surface areas of the arms at the juncture points with the crossbars 44, 45, reduce the bending and tension stresses at the junctures.

FIG. 10 illustrates a number of further modifications. According to one modification, the stem therein designated 130 of the plunger 103 carries two ferromagnetic members 131, 133, each being of rectangular configuration but extending across and enclosing the respective portion of the stem. According to a second modification, two (or more) leaf springs 140 are applied instacked, overlying relation to each other at each end of the plunger 103 for yieldingly mounting the plunger to the electromagnets. Such a modification has been found to reduce noise.

FIG. 10 also illustrates the vibrator incorporated in a diaphragm-type pump, wherein the reciprocatory plunger 103 is fixed to a diaphragm 104, rather than to a piston 4, to produce the same pumping action as in the piston-type pump described above.

While the invention has been described with respect to several embodiments, it will be appreciated that these are set forth merely for purposes of example, and that many other variations, modifications and applications of the invention may be made.

What is claimed is:

1. An electromagnetic vibrator, comprising:

an electromagnetic assembly including a pair of electromagnets each having a core of E-configuration to define three parallel legs joined together at one side by a bridge, and further including a coil on the middle one of the three legs;

said pair of electromagnets being secured together with said bridges facing outwardly and with the legs aligned with, but spaced from, each other;

a plunger carrying magnetisable material disposed within the space between the legs of the electromagnets with the longitudinal axis of the plunger perpendicular to said parallel legs such that the plunger is movable along the longitudinal axis of the plunger upon the energization of the coils of the electromagnets;

said coils of the electromagnets being energized by unidirectional current such that the middle leg of each electromagnet defines a first magnetic pole of one polarity, which is the same in both electromagnets, and the other two legs define second and third magnetic poles of the opposite polarity in the two electromagnets;

and spring means including at least one spring yieldingly mounting said plunger to the electromagnets.

2. The vibrator according to claim 1, wherein said plunger includes a non-magnetic stem carrying a ferromagnetic member acted upon by said first and second magnetic poles of each electromagnet, and a ferromagnetic member acted upon by said first and third magnetic poles of each electromagnet.

3. The vibrator according to claim 2, wherein said non-magnetic stem has a rectangular cross-section.

4. The vibrator according to claim 2, wherein there are two of said ferromagnetic members secured to the opposite sides of the non-magnetic stem acted upon by said first and second magnetic poles of each electromagnet, and two of said ferromagnetic members secured to the opposite sides of the non-magnetic stem acted upon by said first and third magnetic poles of each electromagnet.

5. The vibrator according to claim 2, wherein said ferromagnetic members extend around the non-magnetic stem at opposite ends thereof.

6. The vibrator according to claim 2, wherein each of said ferromagnetic members is tapered at one end.

7. The vibrator according to claim 1, wherein each of said electromagnetic cores is of a laminated construction.

8. The vibrator according to claim 1, wherein said spring means includes a pair of springs each yieldingly mounting one end of said plunger to the electromagnets;

each of said springs being a leaf spring including a center leg straddled on its opposite sides by a pair of side legs all integrally joined together at their opposite ends by crossbars;

said center leg being formed with a hole for fixing thereto the respective end of the plunger;

each of said side legs being formed with a hole for fixing said spring to the electromagnet assembly.

9. The vibrator according to claim 1, wherein said coils are energized by an AC power supply which includes a half-wave rectifier for supplying unidirectional current to the coils.

10. The vibrator according to claim 9, wherein the natural frequency of said springs and plunger is substantially equal to the frequency of said AC power supply.

11. A pump having a reciprocatable pumping member and an electromagnetic vibrator according to claim 1 for driving the reciprocatable pumping member.

12. The pump according to claim 11, wherein said pumping member is a piston.

13. The pump according to claim 11, wherein said pumping member is a diaphragm.

14. An electromagnetic vibrator, comprising:

an electromagnet assembly;

a plunger carrying magnetisable material reciprocatably movable within the electromagnet assembly in the direction of the longitudinal axis of the plunger;

and a pair of springs each yieldably mounting one end of the plunger to the electromagnet assembly, each of said springs being yieldable in the direction of the longitudinal axis of the plunger and stiff in the direction of the transverse axis of the plunger;

each of said springs being a leaf spring including a center leg straddled on its opposite sides by a pair of side legs all integrally joined together at their opposite ends by crossbars;

said center leg being formed with a hole for fixing thereto the respective end of the plunger, and each of said side legs being formed with a hole for fixing the leaf spring to the electromagnet assembly.

15. The vibrator according to claim 9, wherein said electromagnet assembly comprises:

a pair of electromagnets each including a core of E-configuration to define three parallel legs joined together at one side by a bridge, and further including a coil on the middle one of the three legs;

said pair of electromagnets being secured together with the bridges facing outwardly and with the legs aligned, but spaced from, each other to define a space for receiving said plunger.

16. The vibrator according to claim 14, wherein said holes in the legs of each leaf spring are colinear with the central axis of the leaf spring.

17. The vibrator according to claim 16, wherein each of said leaf springs is flat and is formed with cutouts which define legs having enlarged areas around each hole for reducing stress concentrations at their fixation points, and enlarged areas at their junctures with the crossbars for increasing their resistance to beinding and torsion stresses.

18. The vibrator according to claim 17, wherein said cutouts in the leaf spring include: a first cutout between the center leg and one side leg; and a second cutout between the center leg and the other side leg, said second cutout being of the same configuration as said third cutout.

19. The vibrator according to claim 18, wherein each of said cutouts includes a narrow slit crossing said central axis of the leaf spring and joined to enlarged curved sections at the opposite ends of said narrow slit section.

20. The vibrator according to claim 19, wherein each leaf spring is of square shape, and said enlarged surved sections are of circular shape.

21. The vibrator according to claim 19, wherein each leaf spring is of rectangular configuration and is elongated in the direction of increasing the lengths of said legs to increase the yieldability of the leaf spring along the longitudinal axis of the plunger.

22. The vibrator according to claim 14, wherein the side sections of each leaf spring are fixed to the electromagnet assembly by a common bridge member.

23. The vibrator according to claim 14, wherein there are at least two of said leaf springs in overlying relation to each other for mounting each end of said plunger.

\* \* \* \* \*